United States Patent [19]

Bouldin et al.

[11] Patent Number: 4,762,770
[45] Date of Patent: * Aug. 9, 1988

[54] HIGH CONTRAST OPTICAL MEMORY DISK

[75] Inventors: Eric W. Bouldin, Atherton; Jerome Drexler, Los Altos Hills, both of Calif.

[73] Assignee: Drexler Technology Corporation, Mountain View, Calif.

[*] Notice: The portion of the term of this patent subsequent to Jun. 28, 2005 has been disclaimed.

[21] Appl. No.: 39,505

[22] Filed: Apr. 16, 1987

Related U.S. Application Data

[63] Continuation-in-part of Ser. No. 935,999, Nov. 28, 1986, which is a continuation-in-part of Ser. No. 896,988, Aug. 15, 1986, abandoned, and Ser. No. 855,228, Apr. 23, 1986.

[51] Int. Cl.[4] .................. G03C 1/72; G03C 1/78; G03C 1/94
[52] U.S. Cl. .................... 430/273; 430/275; 430/277; 430/278; 430/290; 430/346; 430/495; 430/525; 430/616; 430/945; 430/964; 346/135.1
[58] Field of Search ............. 430/220, 616, 945, 273, 430/275, 277, 278, 290, 964, 495, 346, 525; 346/135.1

[56] References Cited

U.S. PATENT DOCUMENTS

| | | | |
|---|---|---|---|
| 4,239,338 | 12/1980 | Borrelli et al. | 350/155 |
| 4,269,917 | 5/1981 | Drexler et al. | 430/16 |
| 4,278,756 | 7/1981 | Bouldin et al. | 430/414 |
| 4,278,758 | 7/1987 | Drexler et al. | 430/616 |
| 4,343,879 | 8/1982 | Drexler et al. | 430/14 |
| 4,588,665 | 5/1986 | Drexler | 430/12 |
| 4,635,076 | 1/1987 | Willson et al. | 430/495 X |
| 4,636,804 | 1/1987 | Kuder | 430/964 X |
| 4,673,626 | 6/1987 | Takeda et al. | 430/14 |
| 4,692,394 | 9/1987 | Drexler | 430/140 |

Primary Examiner—Roland E. Martin
Assistant Examiner—Lee C. Wright
Attorney, Agent, or Firm—Thomas Schneck

[57] ABSTRACT

An optical memory disk for laser recorded optical information featuring a gelatin layer having a thin black crust at the top of the layer. The crust is formed by developed black irregular oblong silver particles within the top 0.5 micron of a gelatin colloid matrix. The remainder of the colloid matrix is substantially clear gelatin and a reflective metallic layer is disposed below the gelatin. The disk may be pre-patterned during formation of the crust with control indicia, such as servo track guides or timing marks. User data may be recorded by modification of the black silver particles in the crust with a laser to expose the reflective underlayer. A laser or other light source is used to read data on the medium with optical contrast between the black surface and the reflective metallic layer underlying the gelatin layer which can be observed in the recorded spots.

14 Claims, 3 Drawing Sheets

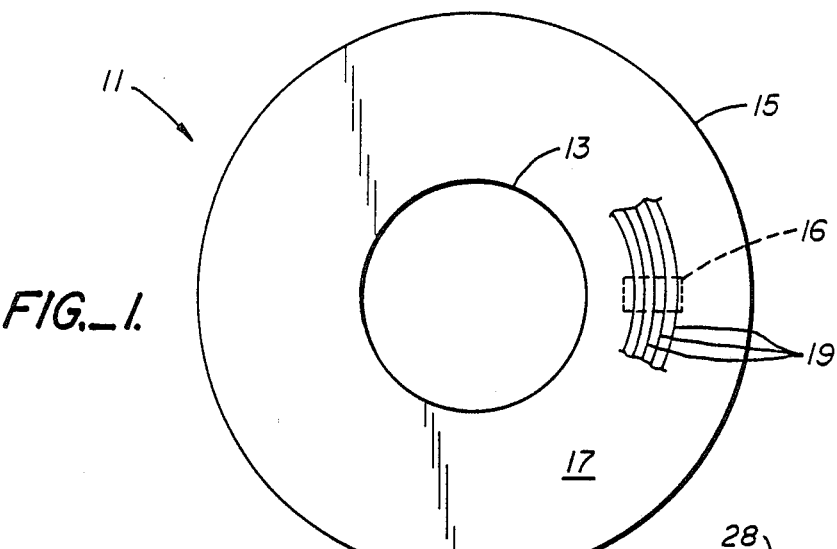
FIG._1.
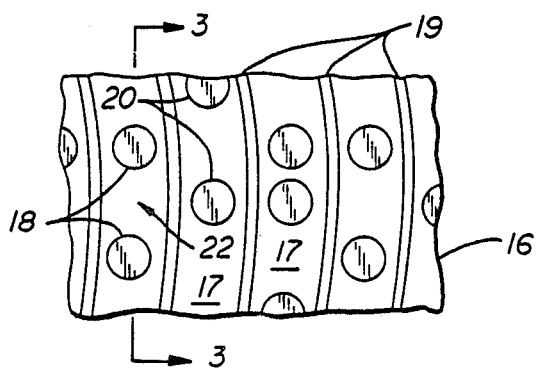
FIG._2.
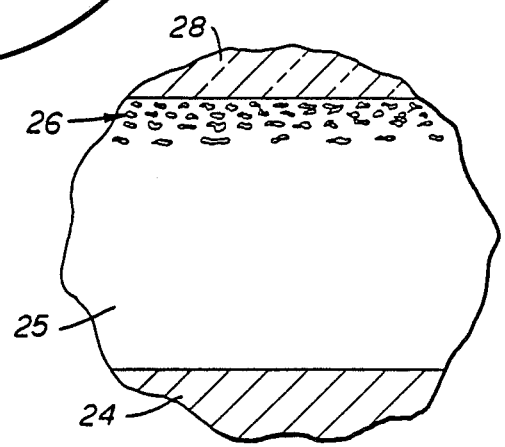
FIG._3A.
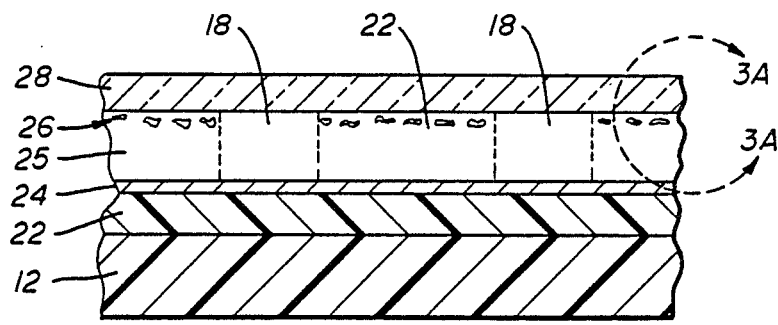
FIG._3.
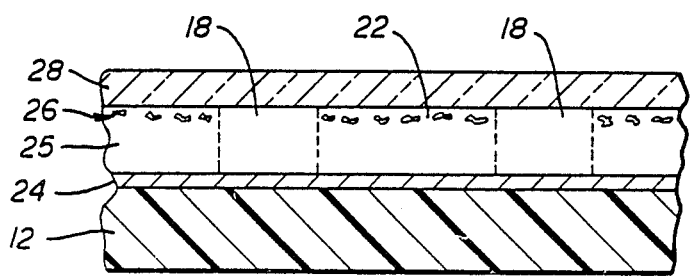
FIG._3B.

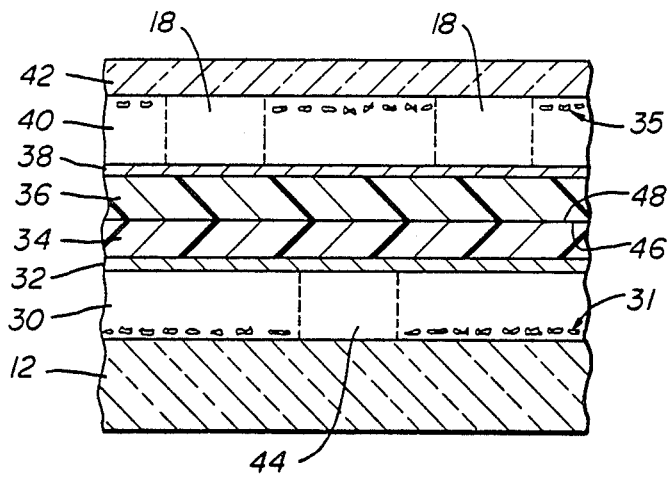
FIG._4.
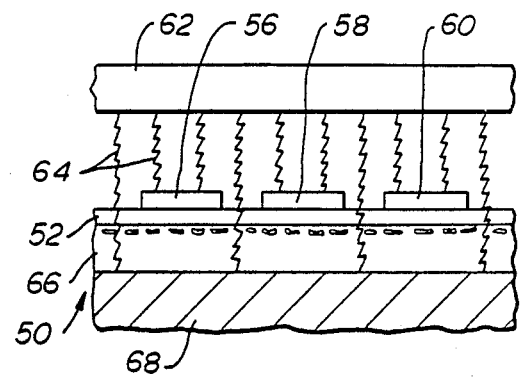
FIG._6.
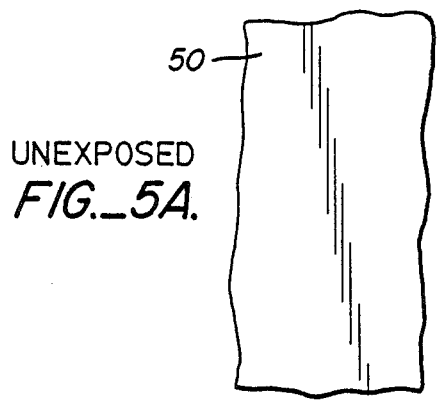
UNEXPOSED
FIG._5A.
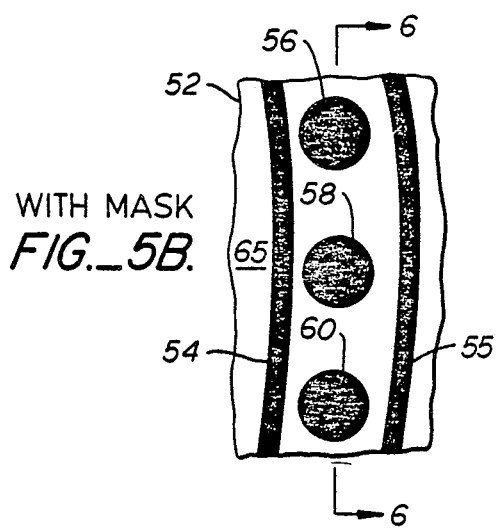
WITH MASK
FIG._5B.
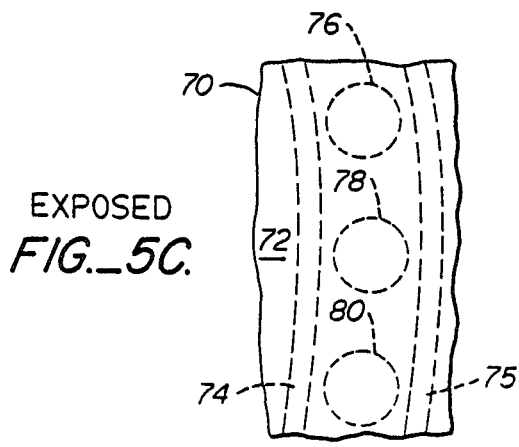
EXPOSED
FIG._5C.
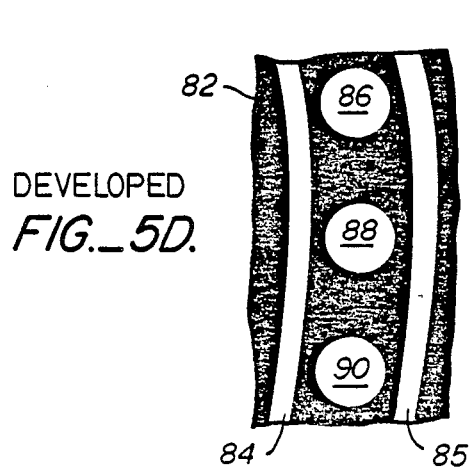
DEVELOPED
FIG._5D.

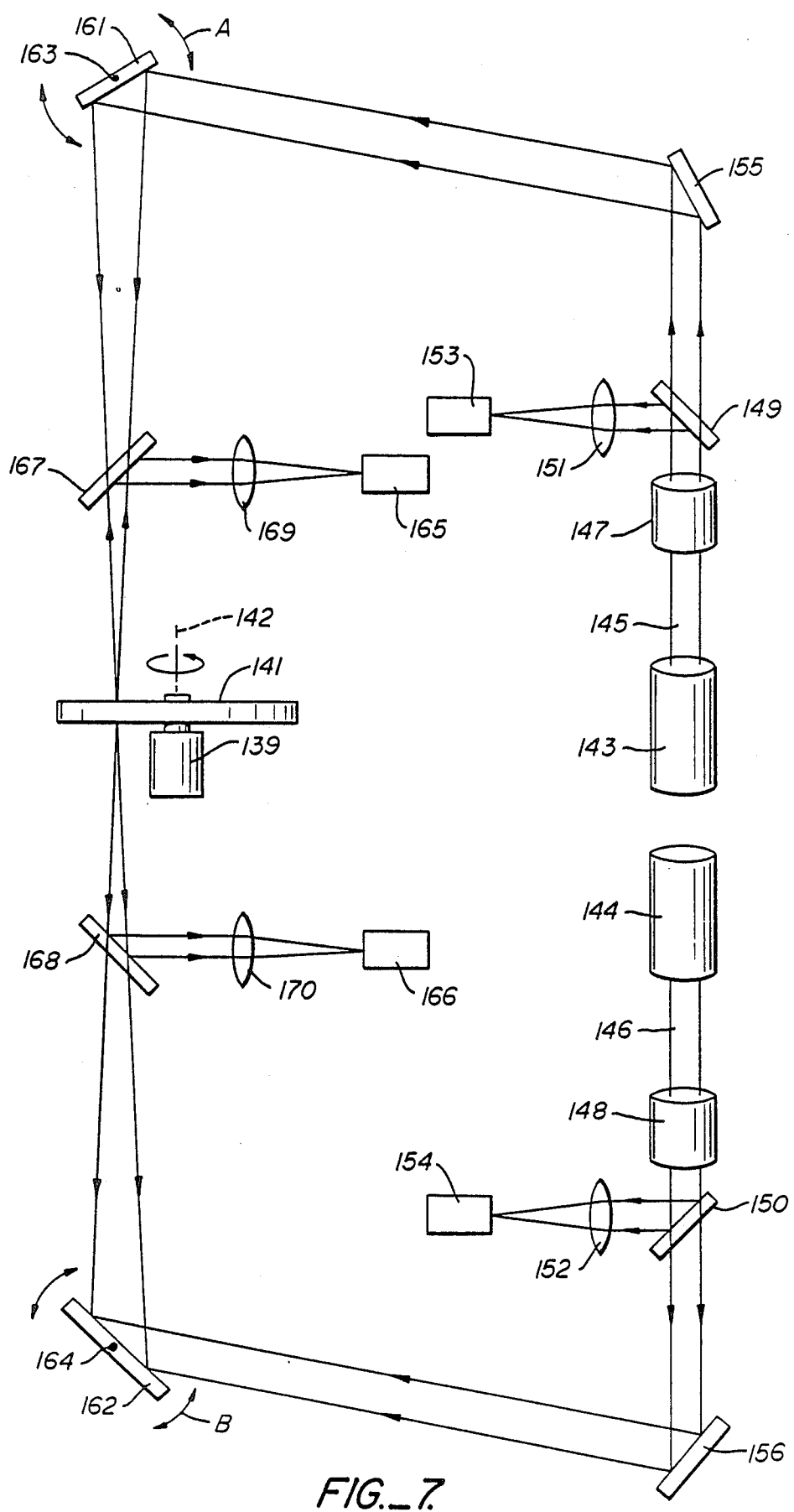
FIG._7.

HIGH CONTRAST OPTICAL MEMORY DISK

CROSS-REFERENCE TO RELATED APPLICATION

This application is a continuation-in-part of application Ser. No. 935,999, filed Nov. 28, 1986, which is a continuation-in-part of application Ser. No. 896,988, filed Aug. 15, 1986, abandoned and a continuation-in-part of application Ser. No. 855,228, filed Apr. 23, 1986.

TECHNICAL FIELD

The invention relates to optical data storage and in particular to an optical memory disk having a high contrast medium adapted for laser recording of data.

BACKGROUND ART

In U.S. Pat. No. 4,239,338, Borrelli et al. teach an optical information storage medium comprising a glass substrate, a 100 Angstrom thick silver layer applied to the substrate, an oxide layer deposited over the silver layer and a multilayer additively colored AgCl/PbO film applied over the oxide layer. The film is optically bleachable using visible light to produce a dichroic, birefringent image. The image is read in infrared light, since the film is transparent at infrared wavelengths down to the silver layers. The silver layer permits reading and writing in the reflective mode. The film should have a thickness not exceeding about two microns to permit high spot resolution.

In U.S. Pat. No. 4,278,756, Bouldin et al. teach a reflective laser recording and data storage medium formed from a photosensitive silver-halide emulsion. The emulsion is exposed and developed using a negative silver diffusion transfer process to make the film surface shiny compared to data spots which are clear or dark. The shiny surface may be above or below the main body of the emulsion depending on whether the reading light is to be introduced from above or from below through a clear substrate.

In reflective optical data storage media, high optical contrast between data spots and the media background and sharply defined data spots are necessary for resolving data, particularly where data spots are small, i.e. one micron or less in size. For optical disks it is also desirable that the optical storage and recording media provide several capabilities in addition to high contrast and high resolution. The media should record with a laser beam, and it should be capable of prerecording servo track guides, timing marks or other formatting indicia and data during manufacturing, and it should be capable of laser recording formatting patterns and data on a finished memory disk. While optical cards are valuable with data bits as large as three to ten microns and optical tape is valuable with data bits as large as one to five microns, optical disks require data bits one micron or smaller to be valuable.

An object of this invention was to achieve adequate recording sensitivity for laser written data on reflective read optical storage media applicable to optical disks, while providing for optional pre-recording of track guides and other formatting information prior to completion of the finished disk and also providing for laser recording of data on finished optical disks.

DISCLOSURE OF THE INVENTION

The above object has been achieved with optical recording disks, having a sensitive laser recording medium which is also suitable for optional pre-recording of tracking or control information. The medium is a laser recording material layer having a thin black upper crust of irregular shaped metal particles forming a dark field with a clear underlayer and with a thin, reflective metallic layer beneath the laser sensitive medium, all disposed on a self-supporting disk backing. Both the crust and clear underlayer reside in the same layer and thus have the same contour. The thin dark crust is highly absorptive to light so that modification, displacement, and/or agglomeration of the metal particles in the crust by laser light reveals the shiny reflective metallic underlayer. A principal effect of laser light on the irregular metal particles of the dark crust is to modify their shape to that of smooth spheroids with reduced covering power. The medium is suitable for track prerecording because it can be patterned with track guides on the surface prior to formation of the dark field.

The optical storage medium can be made in the following way. A transparent substrate layer is covered with three layers to form the optical storage material. Over the substrate layer, a very thin reflective metallic layer is vacuum or vapor deposited, with a total thickness typically of 100 to 1000 Angstroms. Over this reflective layer is a photographic-type gelatin layer which has within it a very thin crust of irregular shaped but nonfilamentary low reflectivity black silver particles. This very thin layer shall be referred to as the black silver crust. The black silver crust may be at the upper surface farthest from the reflective layer or it could be nearer to the reflective layer. This black silver crust may be patterned with clear areas for tracking and control functions since the black silver is created by conversion of a photosensitive emulsion by a photographic exposure and development process.

The developed image pattern transmits light with respect to the surrounding dark, light-absorptive field. Optical contrast is enhanced by means of the metallic layer just above the substrate which reflects light back in the direction from whence it came. The metallic layer may be either gold, silver, aluminum, platinum, rhodium or copper.

Where two similar optical storage substrates are processed as described above, they may be mounted back to back on a planar plastic disk backing. This arrangement yields a double sided optical recording medium in which both sides may be read or written upon simultaneously.

The very thin black silver reflectively read medium of the present invention is a more sensitive laser recording medium compared to some prior film based materials. Additionally, optical contrast is enhanced by means of the underlying reflective layer. The combination of the thin black silver layer, the gelatin layer and the highly reflective metal layer form an optical data storage medium for optical memory disks which has a good laser recording sensitivity, a capability of photolithographically pre-recording track formats and a capability of laser recording data or track formats on finished disks.

BRIEF DESCRIPTION OF DRAWINGS

FIG. 1 is a top plan of an optical memory disk of the present invention.

FIG. 2 is an enlarged portion of the optical memory disk of FIG. 1 revealing data spots.

FIG. 3 is a side sectional view of the optical memory disk taken along the line 3—3 in FIG. 2.

FIG. 3a is a detail magnified about line 3A—3A in FIG. 3.

FIG. 3b is a side sectional view similar to FIG. 3 of an alternate embodiment of optical memory disk of the present invention.

FIG. 4 is a side sectional view similar to FIG. 3 of an alternate embodiment of the otpical memory disk of the present invention.

FIGS. 5A–5D are top plan views of portions of the optical data disk of FIG. 1 illustrating a method of prerecording data spots.

FIG. 6 is a side sectional view taken along the line 6—6 in FIG. 5B.

FIG. 7 is a side plan of a data recording system for use with the optical memory disk of FIG. 1.

BEST MODE FOR CARRYING OUT THE INVENTION

With reference to FIG. 1, an optical data disk 11 having an inner periphery 13 and an outer periphery 15 is seen. The interior of the inner periphery 13 is void so that a centering collar may be used to hold disk 11 on a spindle for high speed rotation, providing fast random access to data stored on the disk. Between the inner and outer peripheries 13 and 15, a recording field 17 is defined. The recording field is shown to have a plurality of concentric, circumferentially-spaced servo guides 19 thereon. Such servo guides are thin lines which define the spaces between circular paths wherein data are written. The pattern for such lines may be applied photographically as explained below.

The disk comprises a self supporting backing to which a high contrast optical recording medium capable of laser writing is applied. The medium may be disposed on one side of the backing to produce a single sided disk, as described below with reference to FIGS. 3 and 3B, or may be disposed on both sides of the backing to produce a double sided disk, as described below with reference to FIG. 4.

With reference to FIG. 2, a magnified view of laser recorded data on disk 11 may be seen. The border 16, corresponds to a small boxed in area in FIG. 1. Data are recorded by forming spots 18 and 20 which contrast with the surrounding field 17 of the disk. Data spots 18 are seen to be circular and aligned in paths. A second group of data spots 20 is seen to be aligned in a second path. Spots 18 and 20, as well as an absence of spots 22, represent data bits. For example, spots 18 and 20 may represent 1's and the absence of spots 22 may represent 0's, or vice versa. Data spots 18 and 20 are typically reflective, with a reflectivity at near infrared wavelengths (0.8 to 1.0 microns) generally in the range of 30% to 50%, while the media background is substantially less reflective, with a reflectivity at near infrared wavelengths (0.8 to 1.0 microns) generally less than 20% and preferably less than 15%. Optical reflective contrast between the reflective data spots and the media background is therefore generally greater than 2 to 1 and preferably at least 3 to 1 at reading beam wavelengths. A minimum contrast between the data spots and the background field of 1.2 to 1 is sufficient for reading. The reflectivity of the data spots is not as high as the 80% to 90% expected from the reflective metals used since there are usually some silver particles remaining in the data spot area which absorb some of the incident and reflected light. The laser recorded spots may be oblong as well as circular. All of the data spots could have similar dimensions which are preferably 1 micron or less in size. Alternatively, the 1's and 0's could be represented by long and short data spots. The spacing between paths is not critical, and may even be adjoining, provided that the optical reading system is able to easily distinguish between paths.

The recording material which is selected should be compatible with the laser used for writing on it. Some materials have a higher recording sensitivity than others at certain wavelengths. Good recording sensitivity to near-infrared light is preferred because semiconductor lasers creating the required light beams are readily available. The selected recording material should have a favorable signal-to-noise ratio and form high contrast databits with read/write systems with which it is used. The material should not lose data when subjected to temperatures of about 140° F. (60° C.) for long periods. The material should also be capable of recording at speeds of at least one hundred thousand bits per second.

With reference to FIGS. 3 and 3a, the optical recording media comprises a substrate layer 22, a highly reflective metallic layer 24 deposited on substrate layer 22 and a selected, thin black silver planar crust 26, generally less than one-half micron thick, within gelatin layer 25. The latter layer is generally one to six microns thick, disposed on metallic layer 24, which is generally 100 Angstroms to 1000 Angstroms thick. During the optical medium manufacturing process the surface of a photosensitive emulsion raw material, such as AgCl-gelatin emulsion, distal to the substrate, is developed to dark or black by exposure to actinic radiation and then to photographic development. Black and clear images can be created if desired by using a photomask. The exposing image is a pattern of either control indicia such as tracks or data or both to be pre-recorded. The depth of the dark layer is typically 0.3 to 0.5 microns. The undeveloped remainder of the emulsion layer which is essentially gelatin remains clear. Substrate layer 22 is disposed over a self supporting disk backing 12 in intimate contact therewith in planar relation. Backing 12 may be transparent or opaque. Backing 12 is typically polycarbonate or other sheet-like, dimensionally stable material, like glass. The thickness of the backing is not critical but should be sufficient to provide strength for resistance against breakage. Also the thickness of the backing may depend on the overall size of the recording medium being used. For a 12-inch disk, a thickness of ⅛ inch may be suitable. A transparent, planar protective layer 28 may be disposed over the laser recording layer 26. Polycarbonate plastic material is one of the preferred cover layers and may be a thin laminating sheet adhered over the disk or, alternatively, a lacquer coating.

Substrate layer 22 is typically about 100 to 150 microns thick, and may be composed of polyesters, cellulose acetate, Mylar, or other materials commonly used as film bases. Metallic layer 24 is typically composed of either gold, copper, silver, aluminum or alloys thereof. Gold is preferred because it has a very high reflectivity at the reading wavelength, at least 90 percent in the near infrared, i.e. a wavelength longer than 0.8 microns, thereby giving high data contrast. Also, gold does not react with the photographic chemicals and is environmentally stable for many years. Gold is also desirable because it may be used with photographic emulsion layers 25 and 26 with actinic wavelengths in the blue to green wavelength range (0.4 to 0.6 microns) with reduced halation effect since gold's reflectivity is about 37% in this actinic wavelength range and gelatin layer 25 is generally less than 3 microns thick. Silver and aluminum are also preferred materials but care must be taken that the aluminum does not contaminate the photographic developer solutions. Copper may also be considered for this application but is not as chemically stable as the other three materials. Metallic layer 24 is deposited on film substrate 23 by well-known vapor or vacuum deposition techniques, for example in coating silicon wafers or magnetic metallic memory disks. The layer is on the order of 100 to 1,000 Angstroms thick.

Gelatin layer 25 originally was a gelatin matrix containing a photographic emulsion layer. The gelatin colloid matrix should be made from material which is substantially transparent to a read beam wavelength in the near infrared, and may be further selected to be substantially more absorptive at an actinic wavelength thereby enhancing the antihalation properties of the recording medium during the preformatting process. Gelatin layer 25 is typically under 3 microns thick, but could be as thick as 10 microns. The gelatin layer 25 containing crust 26 is shown having been exposed to actinic radiation and then developed to be substantially dark only at its surface. Irregular rings in planar crust 26 represent black irregular oblong silver particles embedded in the gelatin colloid matrix.

Areas 18 represent data spots which have been laser recorded by modification, displacement, and/or agglomeration of metal particles in the crust 26 to be predominantly clear, revealing an underlying reflectivity in the metallic layer 24 when illuminated by light of a read beam wavelength, typically in the near infrared. The laser recording beam principally heats the thin dark curst 26 and alters the irregular shape of the silver grains so that they become smooth spheroids. In doing so, the covering power of the silver grains is reduced so that more light can pass between the particles in the spot of modified crust into the underlayer. Heating may also cause some displacement of silver particles away from the spot area, as well as some agglomeration of separate silver particles. Clear areas 18 may also represent photographically prerecorded data spots. Gelatin layer 25 is exposed through an imagewise exposure pattern to actinic radiation, then developed to be substantially dark at its surface. Areas not exposed to actinic radiation are predominantly clear after development and fixing, revealing the underlying reflectivity in metallic layer 24. Servo track lines 19 seen in FIG. 2 are photographically prerecorded as just described. Clear areas 18 are preferably sharply defined, rather than diffuse or otherwise blurred. The optical density of background areas 22 at the read beam wavelength of gelatin layer 25 should be at least 0.5 and preferably greater than 1.0. The optical density of the spot areas 18 of gelatin layer 25 should be not more than 0.2 and preferably less than 0.1.

A method for making the optical storage disk 13 in FIG. 1 comprises depositing metallic layer 24 onto a self-supporting substrate 23 by vacuum or vapor deposition and then applying the thin, planar photosensitive emulsion layer 25 over a reflective metallic layer 24 or alternatively a thin photosensitive emulsion layer over a gelatin layer covering a reflective metallic layer. Alternatively, the thickness of the laser sensitive recording layer can be controlled in the manufacture of the photosensitive starting material of the present invention.

A very thin (0.25–0.5 $\mu$m) photosensitive emulsion can be coated over clear gelatin to achieve the thin recording layer. The resulting photosensitive web is then processed by exposure, development and fixing, as described in greater detail below, to produce a laser sensitive, but not photosensitive medium. Track guides and other control indicia may be photolithographically prerecorded during the processing of the photosensitive web, if desired, by imagewise exposure through a mask. The finished laser sensitive medium is then applied to a disk backing 12 by disposing film substrate 23 over backing 12. A planar, transparent protective layer 28 may finally be adhered over optical storage layer 25.

Alternatively, disks may be formed without film substrate 23, as seen in FIG. 3b. Metallic layer 24 may be deposited directly onto backing 12, and emulsion layer 25, containing the black silver crust 26, disposed over metallic layer 24, instead of first forming a sheet from layers 23, 24 and 25. Also, the disposing of the photosensitive sheet or individual layers 24 and 25 to backing 12 may be performed prior to prerecording and media formation by exposure, development and fixing. It is preferred, however, to complete processing of disk 11 first since it will be easier to handle when it is no longer photosensitive. Again, a transparent protective layer 28 may be adhered over optical storage layer 25.

With reference to FIG. 4, a double sided embodiment of data disk 11 comprises a first laser sensitive optical storage layer 30 with a thin dark crust 31 therein disposed over a self-supporting transparent planar plastic disk backing 12, a first vapor or vacuum deposited metallic layer 32 disposed adjacent film substrate layer 34, a second film substrate layer 36 disposed over first substrate layer 36, a second metallic layer 38 disposed over substrate layer 34, and a second laser sensitive optical storage layer 40 with a thin dark crust 35 therein disposed on metallic layer 38. The optical storage layers 30 and 40 comprise a thin black or dark surface area, as mentioned above, with a clear gelatin underlayer. A transparent protective layer 42 may be disposed over the optical storage layer 40.

First and second film substrate layers 34 and 36 are substantially similar to film substrate 22 in FIG. 3. Metallic layers 32 and 38 may be selected from the group consisting of gold, silver, aluminum, platinum, rhodium, and perhaps copper just as for metallic layer 24 in FIG. 3. Layers 32 and 38 may be identical or made of different metals. As with optical storage layer 26 in FIG. 3, each of the thin optical storage layers 30 and 40 in FIG. 4 was previously created by exposing a photosensitive silver halide emulsion, preferably silver chloride, to actinic radiation, developing and fixing so that the emulsion is substantially dark at the emulsion surface, i.e. about 0.3 microns into the material. The developed emulsion layers 30 and 40 may have an imagewise exposure pattern of partially clear marks 44 and 18 respectively representing prerecorded data bits and servo track lines with underlying high reflectivity in the adjacent metallic layers 32 and 38 respectively for light of reading wavelength. The previously developed emulsion layers 30 and 40 may be exposed and developed either at the same time or separately. As in the single sided embodiments in FIGS. 3 and 3B, data spots 18 and 44 may be laser recorded by modification displacement, or agglomeration of metal particles in the crusts 26 and 31 to reveal the underlying reflectivity in respective metallic layers 38 and 32 when illuminated.

Formation of the optical storage media for the double sided data disk in FIG. 4 may comprise depositing metallic layers 32 and 38 onto film substrate layers 34 and 36, respectively, by vacuum or vapor deposition. Then emulsion layers 30 and 40 are disposed on metallic layers 32 and 38, respectively. Emulsion layers 30 and 40 are then prerecorded as described in detail below with respect to FIGS. 5A-5D and FIG. 6. Each of the resulting sheets of recording material is substantially similar. Layers 30, 32, and 34 form one sheet, while layers 36, 38, and 40 form a second sheet. These optical storage sheets are the laser sensitive, but not photosensitive since all of the silver-halide was converted to silver or removed. The two sheets are then adhered together, with an upper surface 46 of first support layer 34 in intimate planar contact with a lower surface 48 of second support layer 36. One of the optical storage layers, in the present case first optical storage layer 30 is then disposed over transparent backing 12. A protective layer 42 may be disposed over the other optical storage layer, here layer 40. Alternatively, each of the layers may be sequentially disposed over backing 12. Exposure and development of one or more of the emulsion layers 38 and 40 may be performed after disposing onto card base 12 but this is more difficult since the emulsion is photosensitive.

With reference to FIGS. 5A-5D and FIG. 6, a photosensitive medium 50 containing an unexposed photosensitive emulsion layer 66 is disposed for exposure to actinic radiation. The emulsion layer is preferably a fine grain silver chloride emulsion in a gelatin matrix. Other silver halides, such as silver bromide, may be used, but must be developed in a modified developer solution disclosed below to prevent formation of filamentary silver. The smaller the grain sizes of the silver-halide emulsion, the higher the resolution of the final prerecorded product of this invention. The emulsion grain size should be less than 5% of the recording data spot size for best results, and emulsions with grain size on the order of 0.05 microns are commercially available. Antihalation dyes, also known as attenuating or accutance dyes, may also be added to the photographic emulsion to increase the absorptivity of the emulsion at the actinic wavelength thereby concentrating the exposure to the top surface of the emulsion. This can help create a thin black recording crust. It can also reduce any halation effect and give higher resolutions. Such dyes are commonly used and are water soluble and thus are not present when the emulsion has been converted to the optical storage media.

If prerecording of track guides or data spots is desired, a shielding mask such as mask 52 may be placed over unexposed medium 50. The mask 52 typically has two degrees of transmissivity to actinic radiation, being substantially clear over most of its extent, except for an imagewise pattern of optical dense marks 54, 55, 56, 58, 60. Lines 54 and 55 are for forming track guides, while spots 56, 58 and 60 are for prerecording data spots, if desired, and are optional. As seen in FIG. 6, recording medium 50 is exposed with a light source 62 emitting light 64 at actinic wavelengths. Typically, the actinic light 64 has a wavelength in a blue-green range of 0.4 to 0.6 microns, although ultraviolet light with wavelengths less than 0.4 microns may also be used. Light 64 illuminating mask 52 is transmitted through clear areas 65 of mask 52 to emulsion layer 66, but is blocked by dark marks, such as servo track lines 54 and 55 and spots 56, 58, and 60, of mask 52.

Exposure by the emulsion layer 66 to actinic radiation creates a latent image in which silver halide is activated substantially to saturation under clear areas 65 of mask 52 and remain substantially unactivated under dark marks 54, 55, 56, 58 and 60. This latent image is shown in FIG. 5C in which the exposed photosensitive medium 70 contains an emulsion of activated silver halide over substantial regions 72 and unactivated silver halide in track line regions 74 and 75 and spot regions 76, 78 and 80.

Exposed medium 70 is surface developed to produce a medium 82 which is substantially dark over most of its extent, but which may have an imagewise exposure pattern of partially clear track guides and/or spots 84, 85, 86, 88 and 90 revealing the underlying reflectivity in the metallic layer 68 for light of reading beam wavelength. Development of the surface layer is surface development occuring typically within the top 0.3 to 0.5 micron of the emulsion layer in a plane distal from the substrate. Such development occurs by contacting the light exposed image layer with a concentrated development solution for a very short period, before the development solution can diffuse into the material or by means of a slow-diffusing developer such as tertiary butylhydroquinone.

Alternatively, a viscous developer thickened with carboxymethylcellulose may be used. This material is syrupy in consistency and is rolled on. It may be washed off and development stopped with a spray stop bath. It then is treated with a fixing bath. Crusts as thin as five to ten percent of the thickness of a ten to fifteen micron emulsion layer have been made. During development, areas containing black irregular or oblong silver particles are formed from activated silver-halide areas. The volume concentration of activated silver halide at the emulsion surface determines the volume concentration of oblong silver particles, which in turn determines the optical density of the emulsion layer. Accordingly, lines and spots 84, 85, 86, 88, and 90 contain few if any, silver particles since these areas were mostly areas 74, 75, 76, 78 and 80 of unexposed and unactivated silver halide which were under dark marks 54, 55, 56, 58 and 60 of mask 52. Areas containing oblong silver particles should exhibit an optical density as measured with red light of a photographic densitometer of at least 0.5 and preferably greater than 1.0, while the unexposed areas should have densities less than 0.2. Subsequent to development, fixing and rinse steps remove the remaining silver halide from emulsion layer 66.

Exposed silver chloride emulsions, when developed, produce irregularly shaped spheroidal silver particles which are highly absorptive, i.e. black, and which respond to a laser recording beam by modification into bright smooth spherical particles. However, exposed silver bromide emulsions tend to produce filamentary silver particles when developed. Filamentary silver, while black, does not respond to the recording laser beam in the same way as irregular spheroid silver particles, and when filamentary silver is present in the thin crust, laser recording performance is greatly degraded. In order to produce irregular spheroidal silver particles from a silver bromide emulsion, organic stabilizers or antifoggants are included in the developing solution. These compounds include, for example, organic thiols, such as 1-phenyl-1H-tetrazole-5-thiol, 1-phenyl-2-imidazolidine-thione, and 4,4,5-trimethyl-4H-pyrazole-3-thiol. Previously, these compounds have been used to control growth of reflective silver spheres in diffusion transfer photography. In the present instance, the compounds attach themselves to the unreacted silver bromide and inhibit the action of the chemical developing agent. In doing so, the shape of the resulting silver grains is that of irregular spheroids which form a crust with substantial covering power, i.e. low transmissivity. As already noted, silver chloride emulsions do not require the use of organic antifoggants to produce irregular spheroid silver grains.

The final result of these processing steps is a superior laser recording medium comprised of a very thin black silver crust within one of the planar surfaces of a gelatin layer and a reflective underlayer which achieves good recording sensitivity, high contrast and resolution for laser recording of data. Laser recording on this medium is efficient, because the silver particles in the crust are absorptive causing a rise of temperature at the top surface of the crust, thereby facilitating the particle modification, displacement or agglomeration of the crust layer. Also, since the crust is thin, very little time is required for the laser beam to erode through the crust to reveal the reflective metallic layer beneath the gelatin layer. These irregular oblong particles are absorptive of light energy over a very wide spectrum range from ultraviolet to near infrared, permitting a wide variety of lasers to be used for recording.

In FIG. 8, a laser apparatus is seen for reading and writing data on the optical memory disk 141 of FIG. 1. The disk 141 is usually received on a drive mechanism 139 which rotates the disk about an axis 142, bringing the data medium into the trajectory of a laser beam. Disk 141 may be single sided as in FIGS. 3 and 3B or double sided as in FIG. 4. A first laser light source 143, preferably a pulsed semiconductor laser of near infrared wavelength, emits a beam 145 which passes through collimating and focussing optics 147. A second laser light source 144, similar to laser 143, emits a second beam 146 which passes through collimating and focussing optics 148. Only one laser light source 143 or 144 is necessary for reading and writing on one side of disk 141, the other being optional. Both laser light sources 143 and 144 are used for reading and writing data simultaneously on both sides of a double sided disk. Beams 145 and 146 are sampled by beam splitters 149 and 150 which transmit portions of beams 145 and 146 through respective focussing lenses 151 and 152 to photodetectors 153 and 154. Detectors 153 and 154 confirm laser writing and are not essential. The beams are then directed to respective first mirrors 155 and 156, and then toward servo controlled mirrors 161 and 162.

Mirror 161 is mounted for rotation at pivot 163 in the direction indicated by the arrows A. Similarly, mirror 162 is mounted for rotation at pivot 164 in the direction indicated by the arrows B. The purpose of mirrors 161 and 162 is to find the edge of the disk in a coarse mode and then in a fine mode of operation to identify data paths which exist predetermined distances from the edge. The orientation of the disk 141 may be established by a drive motor adjusted by a closed loop angular position servo system of the type used in magnetic disk drives. Reference position information, such as servo track guides, track and sector numbers and clocking information, may be prerecorded on the disk so that position error signals may be generated and used as feedback in motor control. Servo motors, not shown, control the positions of mirrors 161 and 162, driving the mirrors in accord with instructions received from control circuits, as well as from feedback devices. After reading one path, for example, mirror 161 may be turned or slightly rotated so that another path can be read, and so on. Mirrors 161 and 162 typically operate independently, and data stored in each side of disk 141 is generally different.

The beams should deliver sufficient laser pulse energy to the surface of the recording material to create data spots. Typically, 5-20 milliwatts is required, depending on the recording material. A 5 milliwatt semiconductor laser, focused to a one micron beam size, records at temperatures of about 200° C. and is capable of creating spots in less than 10 microseconds. The wavelength of the laser should be compatible with the recording material. In the read mode, laser power is lowered to about 5% of the record power.

Optical contrast between a spot and surrounding field is detected by light detectors 165 and 166 which may be photodiodes. Light is focused onto detectors 165 and 166 by respective beam splitters 167 and 168 and focusing lenses 169 and 170.

The detectors 165 and 166 produce electrical signals corresponding to data spots. These signals are processed and recorded for subsequent display as useful information regarding the data recorded on the disk. The disk may be used to record various types of data, as digital medical images, oil well logging data, satellite survey data, insurance records, personal information, or financial transactions and it may also be used for publishing information.

We claim:

1. An optical memory disk for laser recording and storage of optical information comprising,
   a self-supporting, planar disk backing,
   a vacuum or vapor deposited reflective metallic layer over said disk backing,
   a planar optical storage layer disposed over said metallic layer, said optical storage layer having a planar crust of irregular oblong black silver particles within the top one-half micron of the storage layer distal to the backing and substantially clear gelatin below the crust.

2. The optical memory disk of claim 1 further comprising a film substrate layer disposed over said disk backing in intimate contact therewith in planar relation, said metallic layer deposited on said film substrate layer.

3. The optical memory disk of claim 1 wherein said metallic layer is selected from the group consisting of gold, silver, aluminum, platinum, rhodium, copper and alloys thereof.

4. The optical memory disk of claim 1 wherein a transparent, protective, planar layer is disposed over said optical storage layer.

5. The optical memory disk of claim 1 wherein said optical storage layer contains prerecorded control information.

6. The optical memory disk of claim 1 wherein said optical storage layer contains laser written data.

7. A double-sided optical memory disk comprising,
   a self-supporting, optically transparent planar disk backing,
   a first planar optical storage layer disposed over said disk backing, said optical storage layer having a crust of irregular oblong black silver particles within one-half micron of the storage layer proximal to the backing and substantially clear gelatin above the crust,
   a first vapor or vacuum deposited reflective metallic layer disposed on said gelatin, a first planar support layer disposed over said metallic layer, said support layer having opposed planar surfaces, including a lower surface proximate said disk backing and an upper surface distal to said disk backing, a second planar support layer, substantially identical to said first planar support layer and adhered to the upper surface thereof, a second vapor or vacuum deposited reflective metallic layer disposed over said second planar support layer, a second planar optical storage layer disposed over said second metallic layer, said optical storage layer having a planar crust of irregular oblong black silver particles within the top one-half micron of the storage layer distal to the backing and substantially clear gelatin below the crust, and a transparent, protective, planar layer disposed over said second optical storage layer.

8. The double-sided disk of claim 7 wherein said optical storage layers contain prerecorded control information, each of said optical storage layers having been previously exposed at actinic wavelength and developed and fixed to produce a substantially dark, very thin, black silver crust, but having an imagewise exposure pattern of clear marks revealing the underlying high reflectivity metallic layer for light at the reading wavelength.

9. The double-sided disk of claim 7 wherein said optical storage layers contain laser written data.

10. The double-sided disk of claim 7 wherein said metallic layer material is selected from the group consisting of gold, silver, aluminum, platinum, rhodium, copper and alloys thereof.

11. A method for making an optical memory disk comprising, depositing a vacuum or vapor reflective metallic layer over a self-supporting, planar disk backing, disposing a planar photosensitive emulsion layer over said metallic layer, exposing said emulsion layer with actinic radiation, developing and fixing only a planar crust of said emulsion to be a substantially dark thin layer of irregular silver particles with a substantially clear gelatin layer beneath said crust, and disposing a transparent, planar protective layer over said planar crust.

12. The method of claim 11 further defined by making an imagewise exposure of marks representing control indicia or data, said exposure made in said photosensitive emulsion layer with actinic radiation, and developing and fixing said exposure pattern of image marks being substantially clear revealing an underlying reflectivity in the metallic layer when illuminated by light.

13. The method of claim 11 wherein said photosensitive emulsion layer is composed of a silver chloride emulsion.

14. The method of claim 11 wherein said photosensitive emulsion layer is composed of a silver bromide emulsion and developing said emulsion is performed with a chemical developer containing an organic antifoggant.

* * * * *